(12) United States Patent
Suzuki et al.

(10) Patent No.: US 8,811,972 B2
(45) Date of Patent: Aug. 19, 2014

(54) COMMUNICATION TERMINAL AND COMMUNICATION CONTROL METHOD

(75) Inventors: Toshiyuki Suzuki, Yokohama (JP); Mitsuru Murata, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 274 days.

(21) Appl. No.: 13/382,081

(22) PCT Filed: Jun. 30, 2010

(86) PCT No.: PCT/JP2010/061176
§ 371 (c)(1),
(2), (4) Date: Feb. 3, 2012

(87) PCT Pub. No.: WO2011/004751
PCT Pub. Date: Jan. 13, 2011

(65) Prior Publication Data
US 2012/0129465 A1 May 24, 2012

(30) Foreign Application Priority Data
Jul. 7, 2009 (JP) ................................ P2009-160895

(51) Int. Cl.
*H04M 11/00* (2006.01)
*H04W 24/00* (2009.01)

(52) U.S. Cl.
USPC ...................................... 455/421; 455/456.1

(58) Field of Classification Search
USPC ........ 455/456.1, 41.2, 421, 422.1, 432.1, 440
See application file for complete search history.

(56) References Cited

FOREIGN PATENT DOCUMENTS

| JP | 2001-224074 | 8/2001 |
|----|----|----|
| JP | 2003 32176 | 1/2003 |
| JP | 2003 244739 | 8/2003 |
| JP | 2004 289373 | 10/2004 |
| JP | 2008-182507 | 8/2008 |
| WO | WO 2007/136435 A2 | 11/2007 |
| WO | WO 2007/136435 A3 | 11/2007 |

OTHER PUBLICATIONS

Office Action issued May 15, 2012 in Japan Application No. 2009-160895 (With English Translation).
Combined Office Action and Search Report issued Sep. 18, 2013 in Chinese Patent Application No. 201080030379.0 (with English translation).
International Preliminary Report on Patentability Issued Feb. 14, 2012 in PCT/JP10/61176 Filled Jun. 30, 2010.
International Search Report Issued Aug. 10, 2008 in PCT/JP10/61176 Filed Jun. 30, 2010.

*Primary Examiner* — Eugene Yun
(74) *Attorney, Agent, or Firm* — Oblon, Spivak, McClelland, Maier & Neustadt, L.L.P.

(57) ABSTRACT

A communication terminal (10) including a first communication unit (11) and a second communication unit (12) with a shorter communication distance than the first communication unit (11) includes a presence status detection unit (13) that detects that a distance from a personal computer (50) has changed from a state possible to communicate to a state not possible to communicate for the second communication unit (12), and a communication status control unit (14) that causes a standby interval in intermittent reception performed by the first communication unit (11) to become shorter when a change of the second communication unit (12) from the state possible to communicate to the state not possible to communicate is detected by the presence status detection unit (13). This enables more detailed and accurate tracking of the connection status of the first communication unit (11), which can advance the timing to bring the first communication unit (11) to transition to a disconnection state or a standby state, allowing reduction of power consumption in the first communication unit (11).

12 Claims, 9 Drawing Sheets

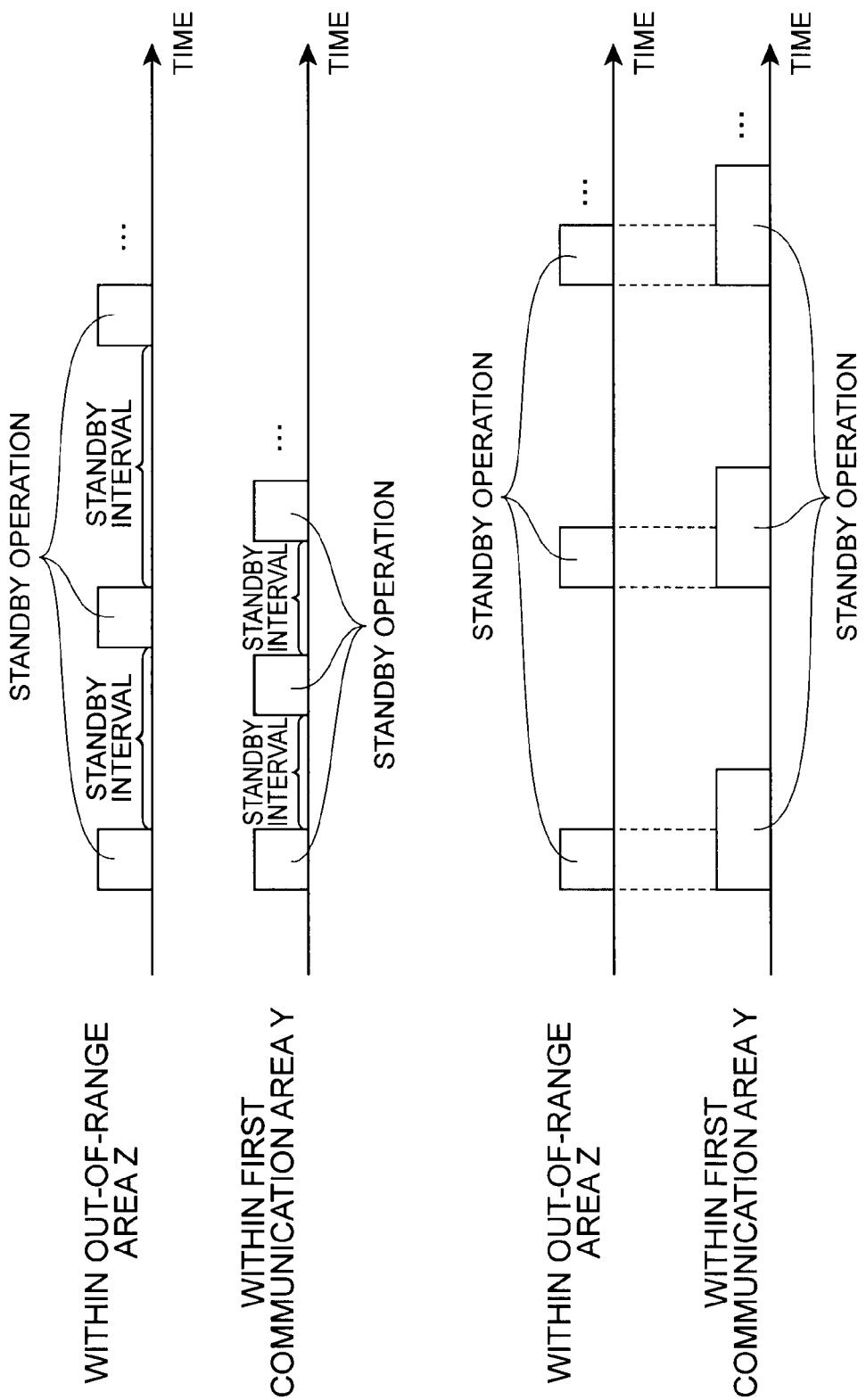

COMMUNICATION TERMINAL AND COMMUNICATION CONTROL METHOD

TECHNICAL FIELD

The present invention relates to a communication terminal having a plurality of different communication means and a communication control method.

BACKGROUND ART

A communication terminal that is equipped with a plurality of different communication interfaces and conducts communications with the conjunction of the plurality of communication interfaces is hitherto known. For example, Patent Document 1 discloses a communication system in which a personal computer and a mobile telephone conduct communications using a contactless IC card and communications using Bluetooth (registered trademark). According thereto, when the mobile telephone comes close to the personal computer, communications using a contactless IC card are conducted between them, and the personal computer acquires a card ID of the contactless IC card from the mobile telephone. Then, based on the acquired card ID, the personal computer identifies the mobile telephone with which communications using Bluetooth are to be conducted, thereby establishing communication.

CITATION LIST

Patent Document

Patent Document 1: JP2003-32176

SUMMARY OF INVENTION

Technical Problem

However, in the above-described hitherto known communication system, despite a difference in the communication distance of the plurality of communication interfaces, considerations such as activating or disconnecting another communication interface based on the communication distance are not taken into account. Therefore, in the case of separating communication terminals to disconnect communications from the state where the communications have been conducted simultaneously with two communication interfaces working in conjunction with each other, for example, the communication interface with a longer communication distance takes a longer time to disconnect its communication than the communication interface with a shorter communication distance. Because it takes time to effect disconnection, there is a problem that power consumption increases. Further, in the case of bringing communication terminals close to each other to conduct communications simultaneously with two communication interfaces working in conjunction with each other, after the communication interface with a longer communication distance becomes ready to communicate, the communication interface with a shorter communication distance is activated to allow communications when the communication terminal enters the communication range of the communication interface with a shorter communication distance. Because the communication interface with a shorter communication distance is activated after entrance into the communication range of the communication interface with a shorter communication distance, there is a problem that it takes time to start communications.

In light of the foregoing, an object of the present invention is to provide a communication terminal with a plurality of different communication means which can efficiently control the communication means, and a communication control method thereof.

Solution to Problem

According to the present invention, there is provided a communication terminal including a first communication means and a second communication means with a shorter communication distance than the first communication means, which includes a presence status detection means that detects that a distance of the communication terminal from another communication terminal to communicate with has changed from a state possible to communicate to a state not possible to communicate for the second communication means, and a communication status control means that causes a standby interval in intermittent reception performed by the first communication means to become relatively shorter when a change of the second communication means from the state possible to communicate to the state not possible to communicate is detected by the presence status detection means.

Further, according to the present invention, there is provided a communication control method of a communication terminal including a first communication means and a second communication means with a shorter communication distance than the first communication means, which includes a presence status detection step that detects that a distance of the communication terminal from another communication terminal to communicate with has changed from a state possible to communicate to a state not possible to communicate for the second communication means, and a communication status control step that causes a standby interval in intermittent reception performed by the first communication means to become relatively shorter when a change of the second communication means from the state possible to communicate to the state not possible to communicate is detected by the presence status detection step.

According to the present invention, the standby interval becomes relatively shorter, which enables more detailed and accurate tracking of the connection status of the first communication means. It is thereby possible to bring the first communication means to transition to the disconnection state or the like promptly at the point when the communication terminal has moved from the inside to the outside of the communication range of the first communication means, thus reducing power consumption in the first communication means.

Further, it is preferred that the communication status control means shortens a standby interval in intermittent reception performed by the first communication means. The standby interval thereby becomes relatively shorter, and it is possible to bring the first communication means to transition to the disconnection state or the like promptly at the point when the communication terminal has moved from the inside to the outside of the communication range of the first communication means, thus reducing power consumption in the first communication means.

Further, it is preferred that the communication status control means lengthens a standby operation in intermittent reception performed by the first communication means. The standby interval thereby becomes relatively shorter, and it is possible to bring the first communication means to transition to the disconnection state or the like promptly at the point when the communication terminal has moved from the inside to the outside of the communication range of the first communication means, thus reducing power consumption in the first communication means.

Further, according to the present invention, there is provided a communication terminal including a first communication means and a second communication means with a shorter communication distance than the first communication means, which includes a presence status detection means that detects that a distance of the communication terminal from another communication terminal to communicate with has changed from a state possible to communicate to a state not possible to communicate for the second communication means, and a communication status control means that causes a standby interval in intermittent reception performed by the first communication means to become relatively longer when a change of the second communication means from the state possible to communicate to the state not possible to communicate is detected by the presence status detection means.

Further, according to the present invention, there is provided a communication control method of a communication terminal including a first communication means and a second communication means with a shorter communication distance than the first communication means, which includes a presence status detection step that detects that a distance of the communication terminal from another communication terminal to communicate with has changed from a state possible to communicate to a state not possible to communicate for the second communication means, and a communication status control step that causes a standby interval in intermittent reception performed by the first communication means to become relatively longer when a change of the second communication means from the state possible to communicate to the state not possible to communicate is detected by the presence status detection step.

According to the present invention, the standby interval becomes longer, which results in a decrease in the number of times that the first communication means performs the standby operation during the time when the communication terminal moves from the inside to the outside of the communication range of the first communication means, thus reducing power consumption in the first communication means.

Further, it is preferred that the communication status control means lengthens a standby interval in intermittent reception performed by the first communication means. The standby interval thereby becomes relatively longer, thus reducing power consumption in the first communication means.

Further, it is preferred that the communication status control means shortens a standby operation in intermittent reception performed by the first communication means. The standby interval thereby becomes relatively longer, thus reducing power consumption in the first communication means.

Further, according to the present invention, there is provided a communication terminal including a first communication means and a second communication means with a shorter communication distance than the first communication means, which includes a presence status detection means that detects that a distance of the communication terminal from another communication terminal to communicate with has changed from a state not possible to communicate to a state possible to communicate for the first communication means, and a communication status control means that causes a standby interval in intermittent reception performed by the second communication means to become relatively shorter when a change of the first communication means from the state not possible to communicate to the state possible to communicate is detected by the presence status detection means.

Further, according to the present invention, there is provided a communication control method of a communication terminal including a first communication means and a second communication means with a shorter communication distance than the first communication means, which includes a presence status detection step that detects that a distance of the communication terminal from another communication terminal to communicate with has changed from a state not possible to communicate to a state possible to communicate for the first communication means, and a communication status control step that causes a standby interval in intermittent reception performed by the second communication means to become relatively shorter when a change of the first communication means from the state not possible to communicate to the state possible to communicate is detected by the presence status detection step.

According to the present invention, the standby interval becomes relatively shorter, which enables more detailed and accurate tracking of the connection status of the second communication means. It is thereby possible to bring the second communication means to transition to the communication state promptly at the point when the communication terminal has moved from the outside to the inside of the communication range of the second communication means, thus reducing the time to start communication, thereby improving the convenience of users.

Further, it is preferred that the communication status control means shortens a standby interval in intermittent reception performed by the second communication means. The standby interval thereby becomes relatively shorter, and it is possible to bring the second communication means to transition to the communication state promptly at the point when the communication terminal has moved from the outside to the inside of the communication range of the second communication means, thereby improving the convenience of users.

Further, it is preferred that the communication status control means lengthens a standby operation in intermittent reception performed by the second communication means. The standby interval thereby becomes relatively shorter, and it is possible to bring the second communication means to transition to the communication state promptly at the point when the communication terminal has moved from the outside to the inside of the communication range of the second communication means, thereby improving the convenience of users.

Advantageous Effects of Invention

According to the present invention, it is possible to provide a communication terminal with a plurality of different communication means which can efficiently control the communication means, and a communication control method thereof.

BRIEF DESCRIPTION OF DRAWINGS

FIG. 9 is a view showing a change in a standby operation signal according to the third embodiment.

DESCRIPTION OF EMBODIMENTS

Figure 1:
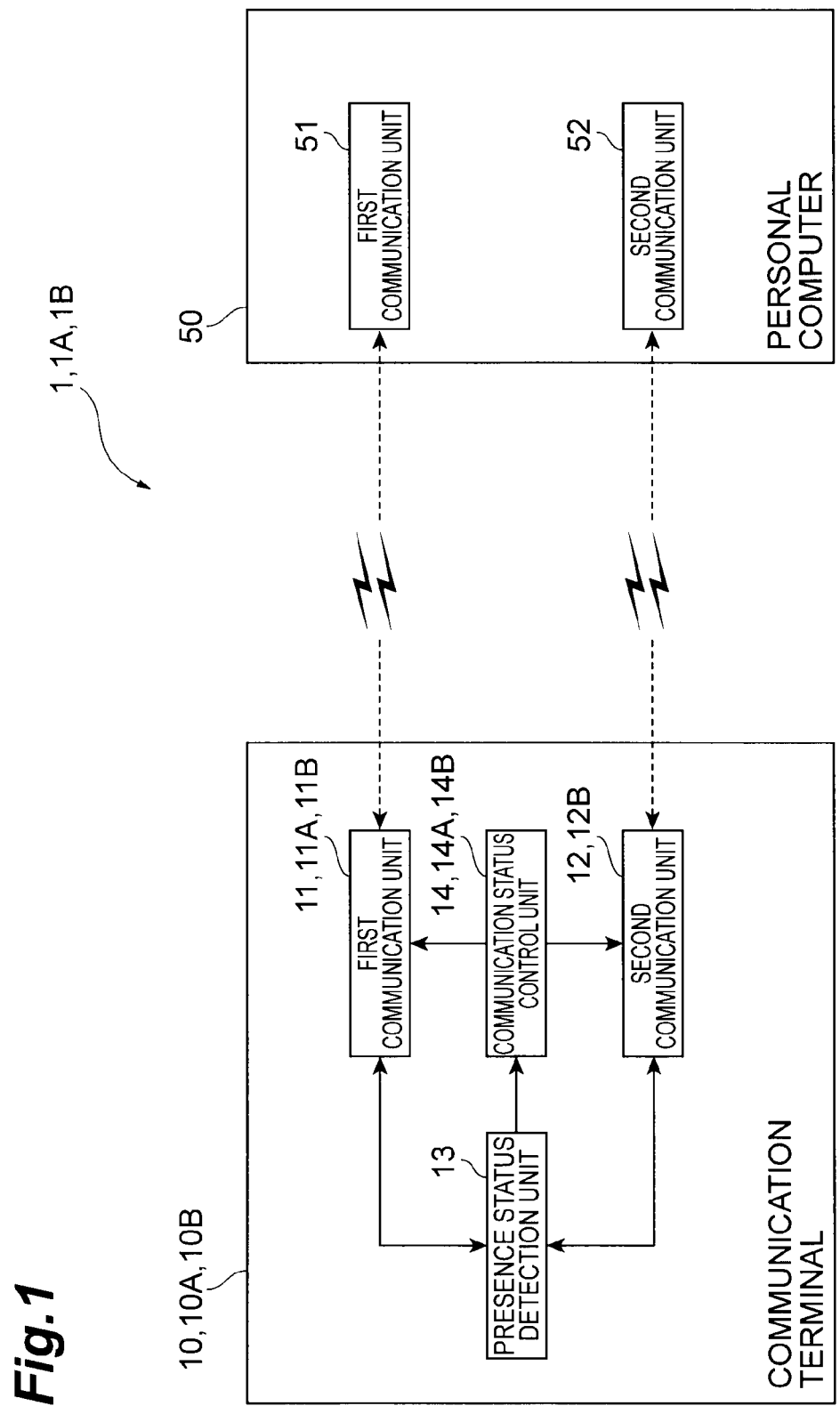
FIG. 1 is a functional block diagram of a communication system according to first to third embodiments.

Hereinafter, preferred embodiments of a communication system to which a communication terminal according to the present invention is applied will be described in detail with reference to the drawings. Note that, in the embodiments, communications are conducted between the communication terminal according to the present invention and a personal computer by way of illustration. Further, in the drawings, the same elements are denoted by the same reference symbols, and the redundant explanation thereof is omitted.

(First Embodiment)

An overall configuration of a communication system according to the embodiment is described firstly.

FIG. 1 is a block diagram showing a functional configuration of a communication system 1 according to the embodiment. A communication terminal 10 is functionally composed of a first communication unit 11 (first communication means) and a second communication unit 12 (second communication means) that conduct communications with a personal computer 50, a presence status detection unit 13 (presence status detection means), and a communication status control unit 14 (communication status control means). Note that a communication terminal having a voice call function to which functions of the communication terminal according to the present invention is applied is used as the communication terminal 10 by way of illustration.

The personal computer 50 (another communication terminal) is functionally composed of a first communication unit 51 and a second communication unit 52 that conduct communications with the communication terminal 10.

Figure 2:
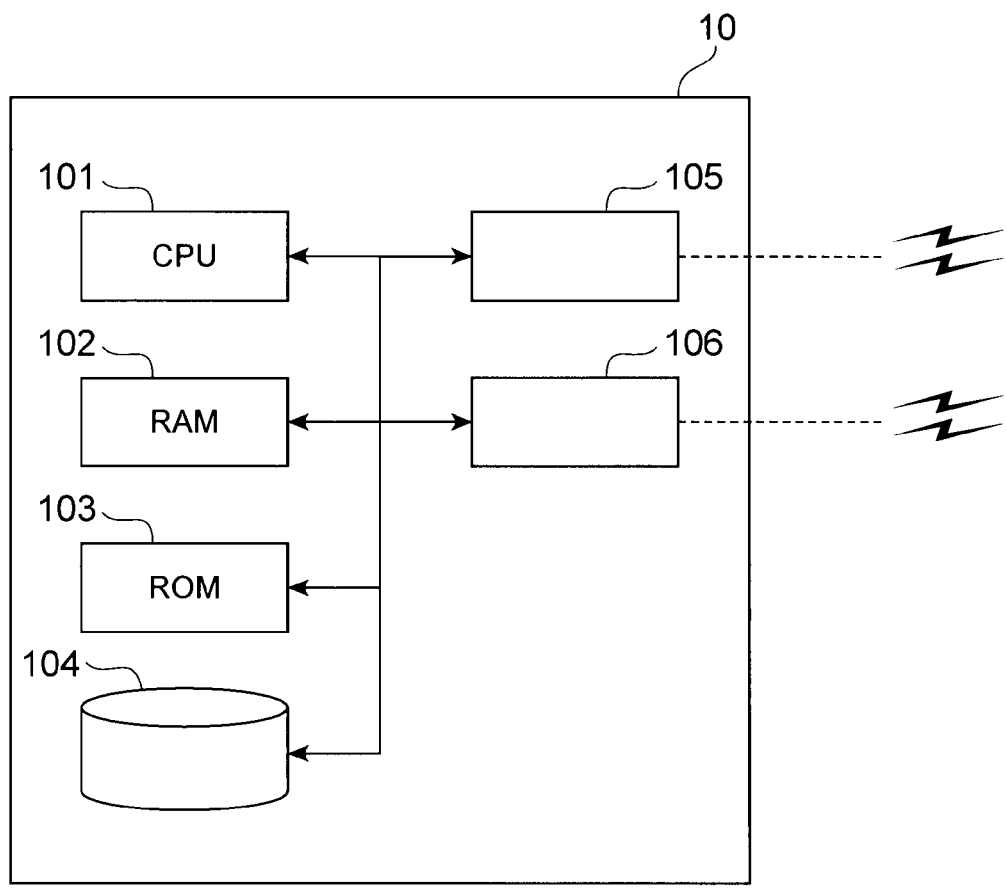
FIG. 2 is a hardware block diagram of a communication terminal.

FIG. 2 is a hardware block diagram of the communication terminal 10. As shown in FIG. 2, the communication terminal 10 is physically configured as a computer system including a CPU 101, a RAM 102 and a ROM 103 serving as a main memory, an auxiliary memory 104 such as a hard disk, a first communication interface 105 and a second communication interface 106, which are data transmitting and receiving devices such as a network card and the like. The functions illustrated in FIG. 1 are implemented by loading given computer software into hardware such as the CPU 101 or the RAM 102 shown in FIG. 2 and thereby making the first communication interface 105 and the second communication interface 106 operate for communications under control of the CPU 101 and further performing reading and writing of data in the RAM 102 and the auxiliary memory 104. Particularly, the function of the first communication unit 11 shown in FIG. 1 is implemented by bringing the first communication interface 105 in FIG. 2 into operation, and the function of the second communication unit 12 shown in FIG. 1 is implemented by bringing the second communication interface 106 in FIG. 2 into operation.

Each functional element is described in detail hereinafter with reference to FIG. 1.

The first communication unit 11 of the communication terminal 10 conducts radio communications with the first communication unit 51 of the personal computer 50. The first communication units 11 and 51 conduct communications using the FeliCa (registered trademark) function, which is a contactless IC card. The communication distance in this case is about 10 cm at maximum. Note that it is assumed that the communication terminal 10 and the personal computer 50 transmit and receive accounting information by conducting communications through the FeliCa function between the first communication unit 11 and the first communication unit 51. Note that communications conducted between the first communication unit 11 and the first communication unit 51 are referred to hereinafter as the first communication. Further, the first communication unit 11 performs intermittent reception that receives signals transmitted at predetermined time intervals from the first communication unit 51, with the first communication unit 51.

The second communication unit 12 of the communication terminal 10 conducts radio communications with the second communication unit 52 of the personal computer 50. The second communication units 12 and 52 conduct communications using the TransferJet (registered trademark) function. The distance of communication in this case is about 3 cm at maximum. The communication terminal 10 and the personal computer 50 transmit and receive data of music or the like, for example, by communications through the TransferJet function conducted between the second communication unit 12 and the second communication unit 52. Note that communications conducted between the second communication unit 12 and the second communication unit 52 are referred to hereinafter as the second communication. Further, the second communication unit 12 performs the intermittent reception with the second communication unit 52.

The first communication and the second communication make communications in conjunction with each other. A specific example includes the case where processing of payment from the communication terminal 10 to the personal computer 50 by the first communication through the FeliCa function and processing of transmission of music data from the personal computer 50 to the communication terminal 10 by the second communication through the TransferJet function are performed in conjunction with each other.

The presence status detection unit 13 detects, as a presence status, whether the position of the communication terminal 10 is where communication with the personal computer 50 is possible or not possible for each of the first communication and the second communication. For example, the presence status detection unit 13 determines whether communication with the personal computer 50 is possible or not possible based on the level of signals received through the intermittent reception by the first communication unit 11 and the second communication unit 12.

The communication status control unit 14 causes the first communication unit 11 and the second communication unit 12 to transition to an activation state, a standby state or a disconnection state, and controls the operation timing of the intermittent reception of them based on the presence status detected by the presence status detection unit 13. For example, the activation state includes a so-called warming-up state where the communication function is not stopped so that communication with the other side can occur immediately upon entrance into the communication range. Further, the standby state includes a sleep state and a power saving state, and the disconnection state includes a state where transmission and reception of signals are forcibly terminated.

The personal computer 50 performs transmission and reception of data with the communication terminal 10 by making the first communication and the second communication work in conjunction with each other. For example, when a user brings the communication terminal 10 close to the personal computer 50 and makes payment from the communication terminal 10 to the personal computer 50 by the first communication through the FeliCa function, the personal computer 50 starts transmission of data of music or the like by the second communication through the TransferJet function based on the payment processing. The communication terminal 10 downloads the transmitted data of music or the like by the second communication, thereby acquiring and using the data.

An operation of the communication terminal 10 according to the embodiment is described hereinbelow.

(Communication State→Disconnection State)

In the following, the case where, in the state where the communication terminal 10 and the personal computer 50 are very close to each other and the first communication and the second communication are being conducted, the communication terminal 10 is separated from the personal computer 50 to turn the communications into the disconnection state is described with reference to FIGS. 3 and 4.

Figure 3:
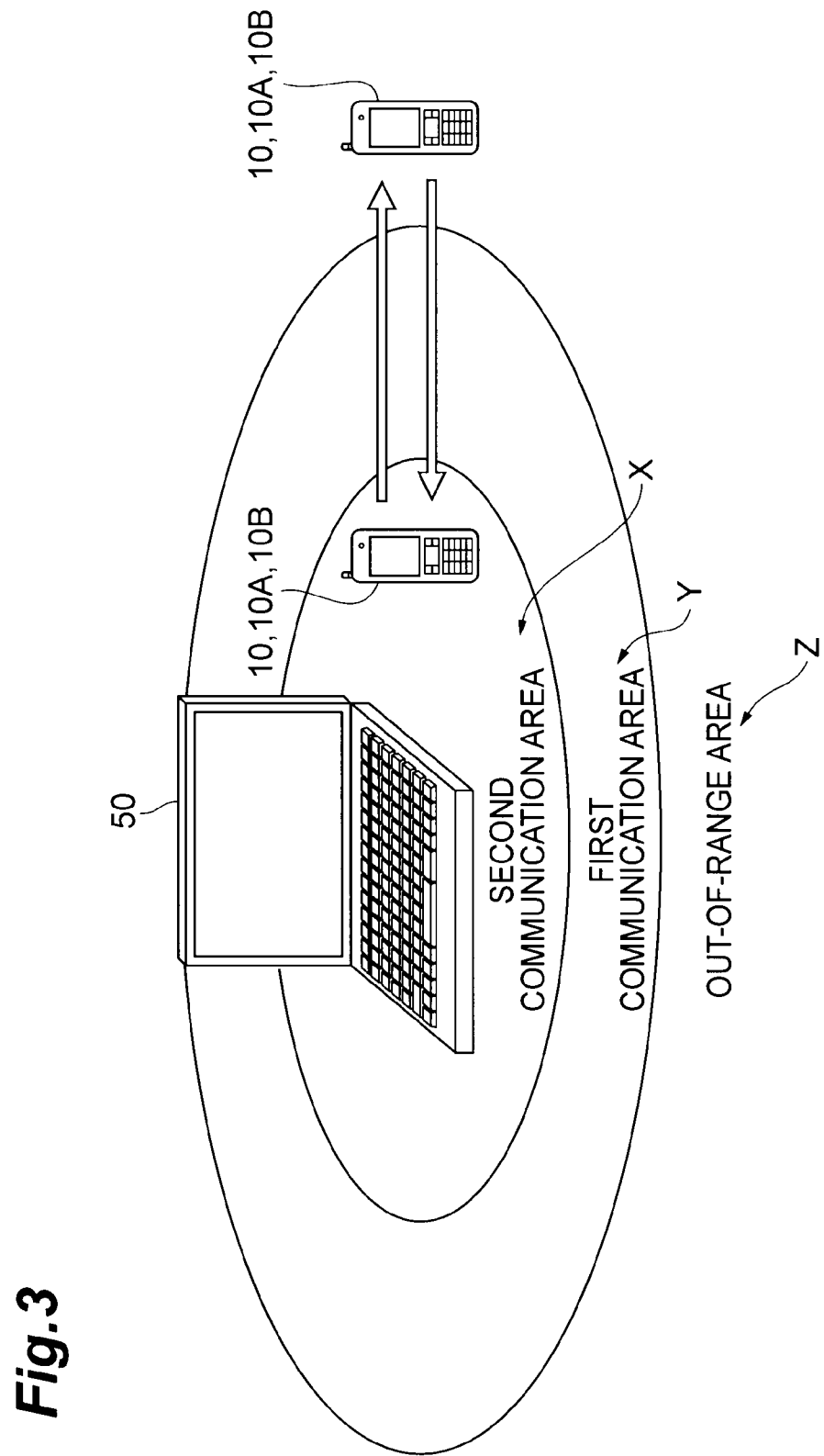
FIG. 3 is a view showing a positional relation between a communication terminal and a communication area.
Figure 4:
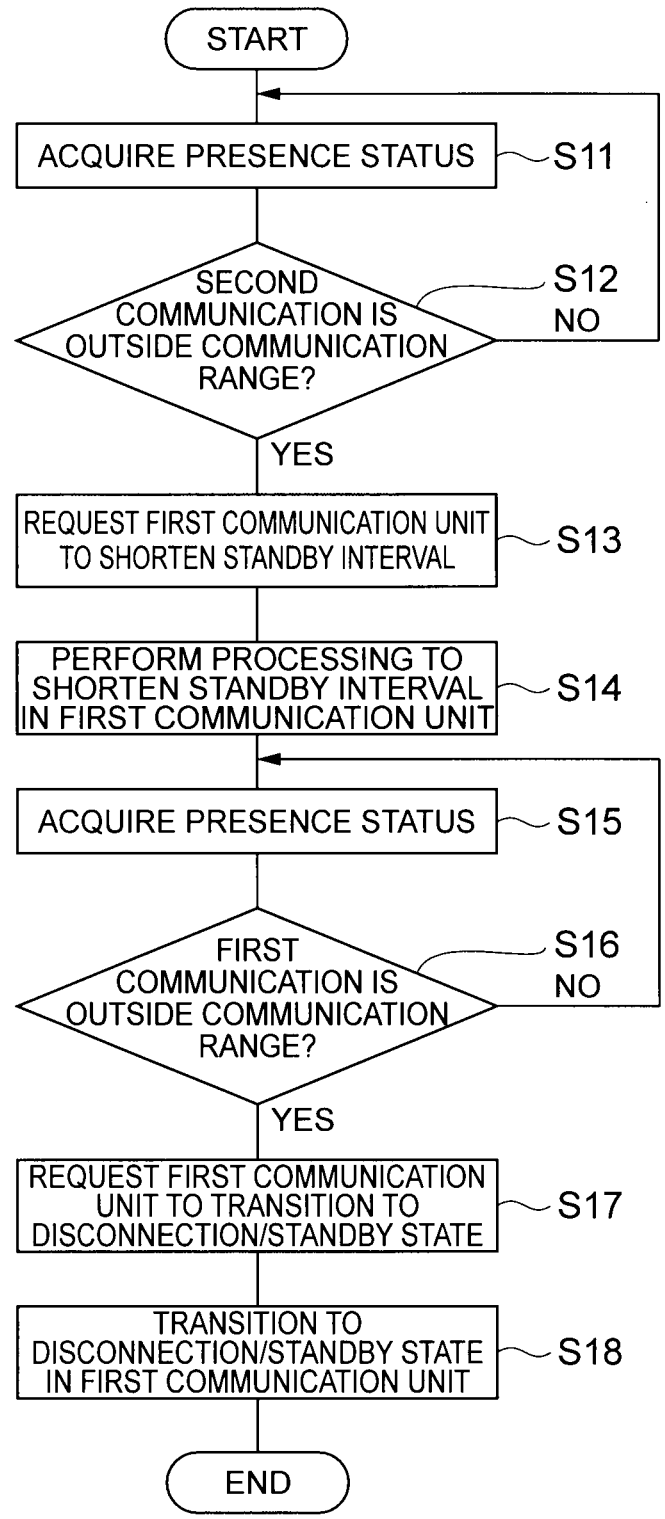
FIG. 4 is a flowchart showing a process flow when a communication terminal is separated from a personal computer according to a first embodiment.

FIG. 3 is a view showing a relation between the position of the communication terminal 10 and a communication range, and FIG. 4 is a flowchart showing a flow of a process performed in the communication terminal 10. Not that, in FIG. 3, when viewed from the personal computer 50, an area where the second communication through the TransferJet function is possible is referred to as a second communication area X, an area where the first communication through the FeliCa function is possible is referred to as a first communication area Y, and an area where the first communication and the second communication are not possible is referred to as an out-of-range area Z. Further, the flowchart of FIG. 4 begins with the state where the communication terminal 10 is within the second communication area X of FIG. 3.

In Step S11 of FIG. 4, the presence status detection unit 13 acquires the presence status indicating whether communication with the personal computer 50 is possible or not possible for each of the first communication unit 11 and the second communication unit 12 by referring to the status of the first communication unit 11 and the second communication unit 12.

In Step S12, the presence status detection unit 13 determines whether the second communication is outside the communication range (where communication cannot be established) and the first communication is within the communication range (where communication can be established). When this condition is not satisfied (S12: NO), i.e. when the communication terminal 10 is within the second communication area X, the process repeats the processing of Steps S11 and S12 until Step S12 is satisfied. On the other hand, when the communication terminal 10 moves to the outside of the second communication area X, the condition of Step S12 is satisfied (S12: YES), and the process proceeds to Step S13. Note that, when the communication terminal 10 moves to the outside of the second communication area X, the second communication becomes unable to be established, and the second communication unit 12 of the communication terminal 10 enters the disconnection state or the standby state.

Figure 5:
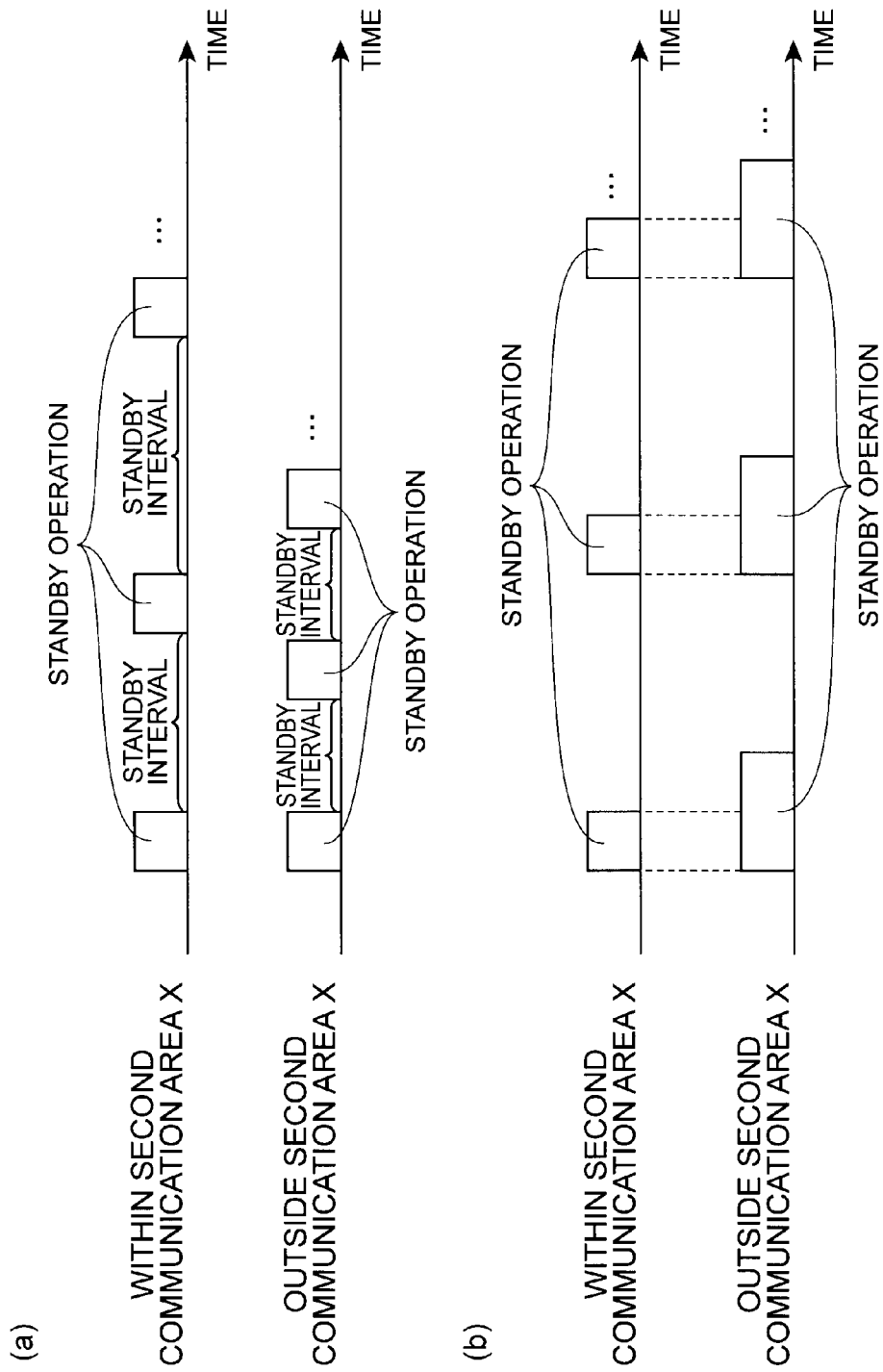
FIG. 5 is a view showing a change in a standby operation signal according to the first embodiment.

In Step S13, the communication status control unit 14 requests the first communication unit 11 to perform processing to shorten the interval of the standby operation (standby interval). Receiving the request from the communication status control unit 14, the first communication unit 11 performs processing to shorten the interval of the standby operation in Step S14. Consequently, when the communication terminal 10 exists outside the second communication area X, the interval of the standby operation processing is shortened compared to the case where it is within the second communication area X, as shown in FIG. 5(a). The shortening of the interval of the standby operation results in an increase in the time that the first communication unit 11 performs processing of the standby operation per unit time, thereby enabling more detailed and accurate tracking of the connection status of the first communication unit 11.

Referring back to FIG. 4, in Step S15, the presence status detection unit 13 acquires the presence status indicating whether communication with the personal computer 50 is possible or not possible by referring to the status of the first communication unit 11.

Then, in Step S16, the presence status detection unit 13 determines whether the first communication is outside the communication range (where communication cannot be established). When this condition is not satisfied (S16: NO), i.e. when the communication terminal 10 is within the first communication area Y, the process repeats the processing of Steps S15 and S16 until Step S16 is satisfied. On the other hand, when the communication terminal 10 moves to the outside of the first communication area Y, the condition of Step S16 is satisfied (S16: YES), and the process proceeds to Step S17.

In Step S17, the communication status control unit 14 requests the first communication unit 11 to transition to the disconnection state or the standby state. Receiving the request from the communication status control unit 14, the first communication unit 11 transitions to the disconnection state or the standby state in Step S18. As a result, when the communication terminal 10 moves to the outside of the first communication area Y, both of the first communication unit 11 and the second communication unit 12 enter the disconnection state or the standby state.

As described above, on occasion when a user separates the communication terminal 10 from the personal computer 50 with an intention to disconnect the first communication and the second communication, at the point when the communication terminal 10 moves to the outside of the second communication area X with a shorter communication distance, the second communication unit 12 enters the disconnection state, and further the interval of the standby operation of the first communication unit 11 is shortened. The shortening of the interval of the standby operation enables more detailed and accurate tracking of the connection status of the first communication unit 11, which allows prompt detection that the communication terminal 10 has moved from the first communication area Y to the out-of-range area Z. It is thereby possible to bring the first communication unit 11 to transition to the disconnection state or the standby state promptly at the point when the communication terminal 10 has moved to the out-of-range area Z, thus reducing the power consumption in the first communication unit 11.

(Alternative Example)

The interval of the standby operation performed by the first communication unit 11 is shortened in Step S14 of FIG. 4 in the above embodiment; however, as an alternative example, the time of the standby operation may be lengthened (processing time may be lengthened) when the communication terminal 10 exists outside the second communication area X as shown in FIG. 5(b). In this case also, the time that the first communication unit 11 performs processing of the standby operation per unit time increases, thereby enabling more detailed and accurate tracking of the connection status of the first communication unit 11. Therefore, as in the first embodiment, it is possible to bring the first communication unit 11 to transition to the disconnection state or the standby state promptly at the point when the communication terminal 10 has moved to the out-of-range area Z, thus reducing the power consumption in the first communication unit 11.

Note that the lengthening of the processing time of the standby operation in the above alternative example and the shortening of the standby interval in the first embodiment may be done at the same time. In this case, more detailed and accurate tracking of the connection status of the first communication unit 11 are achieved, and the power consumption can be further reduced.

(Second Embodiment)

An overall configuration of a communication system according to the embodiment is described firstly. Note that the communication system in this embodiment is the one in which processing details of the first communication unit 11 and the communication status control unit 14 in the first embodiment are altered.

FIG. 1 is a block diagram showing a functional configuration of a communication system 1A according to the embodiment. A communication terminal 10A is functionally composed of a first communication unit 11A (first communication means) and a second communication unit 12 (second communication means) that conduct communications with a personal computer 50, a presence status detection unit 13 (presence status detection means), and a communication status control unit 14A (communication status control means).

The personal computer 50 (another communication terminal) is functionally composed of a first communication unit 51 and a second communication unit 52 that conduct communications with the communication terminal 10A.

The first communication unit 11A of the communication terminal 10A conducts radio communications with the first communication unit 51 of the personal computer 50, and the first communication units 11A and 51 conduct communications using the FeliCa (registered trademark) function, which is a contactless IC card. Note that communications conducted between the first communication unit 11A and the first communication unit 51 are referred to hereinafter as the first communication.

The other elements and functions in the communication system 1A are the same as those of the first embodiment, and the explanation thereof is omitted. Further, a hardware configuration of the communication terminal 10A is also the same as the configuration explained using FIG. 2 in the first embodiment, and the explanation thereof is omitted.

An operation of the communication terminal 10A according to the embodiment is described hereinbelow.

(Communication State→Disconnection State)

In the following, the case where, in the state where the communication terminal 10A and the personal computer 50 are very close to each other and the first communication and the second communication are being conducted, the communication terminal 10A is separated from the personal computer 50 to turn the communications into the disconnection state is described with reference to FIGS. 3 and 6.

Figure 6:
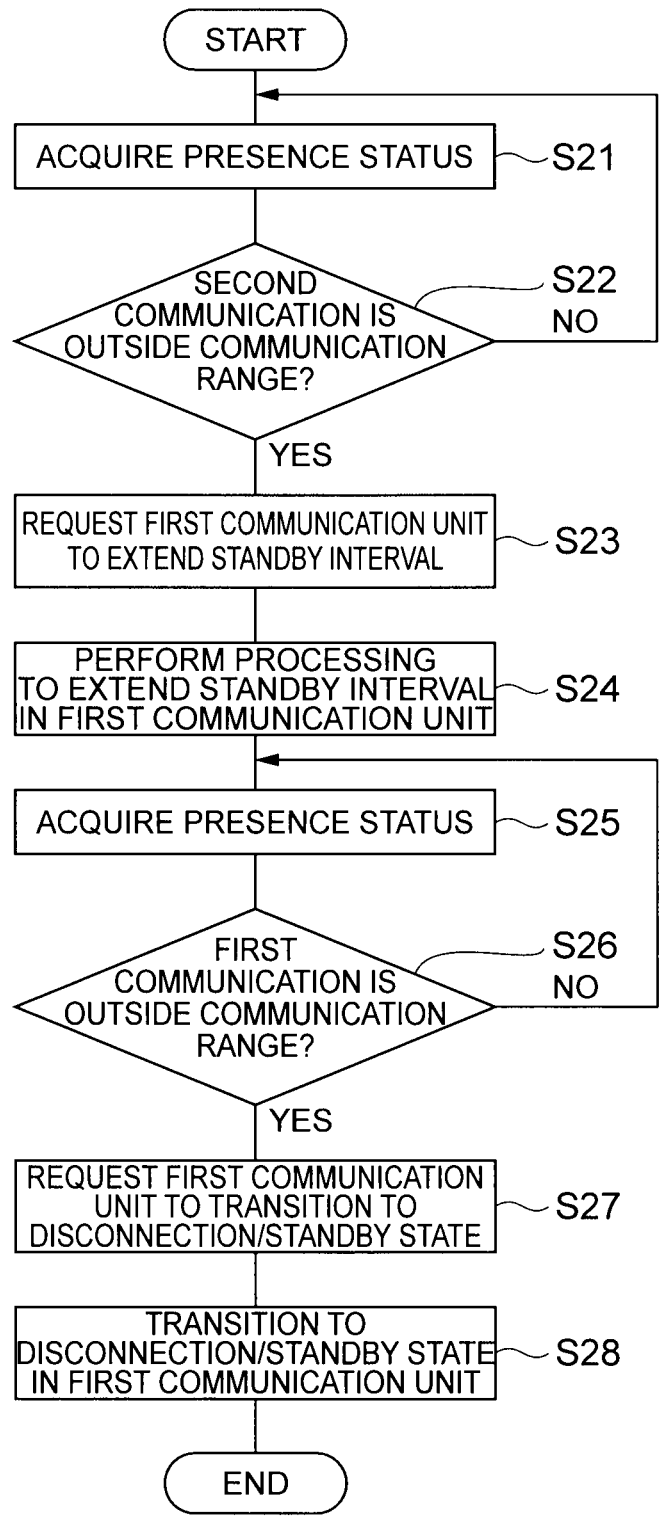
FIG. 6 is a flowchart showing a process flow when a communication terminal is separated from a personal computer according to a second embodiment.

FIG. 6 is a flowchart showing a flow of a process performed in the communication terminal 10A. Further, the flowchart of FIG. 6 begins with the state where the communication terminal 10A is within the second communication area X of FIG. 3.

In Step S21 of FIG. 6, the presence status detection unit 13 acquires the presence status indicating whether communication with the personal computer 50 is possible or not possible for each of the first communication unit 11A and the second communication unit 12 by referring to the status of the first communication unit 11A and the second communication unit 12.

In Step S22, the presence status detection unit 13 determines whether the second communication is outside the communication range (where communication cannot be established) and the first communication is within the communication range (where communication can be established). When this condition is not satisfied (S22: NO), i.e. when the communication terminal 10A is within the second communication area X, the process repeats the processing of Steps S21 and S22 until Step S22 is satisfied. On the other hand, when the communication terminal 10A moves to the outside of the second communication area X, the condition of Step S22 is satisfied (S22: YES), and the process proceeds to Step S23. Note that, when the communication terminal 10A moves to the outside of the second communication area X, the second communication becomes unable to be established, and the second communication unit 12 of the communication terminal 10A enters the disconnection state or the standby state.

Figure 7:
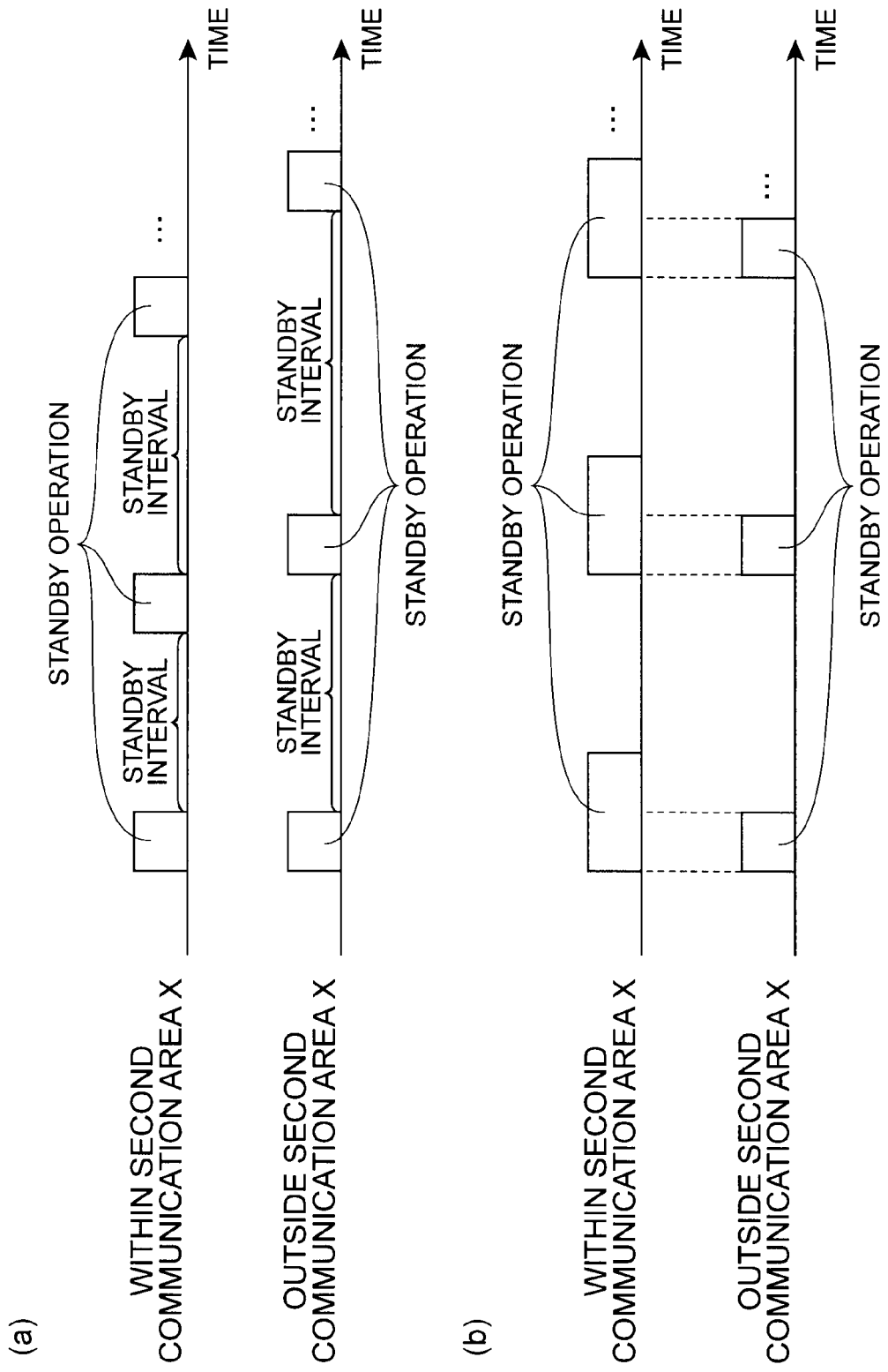
FIG. 7 is a view showing a change in a standby operation signal according to the second embodiment.

In Step S23, the communication status control unit 14A requests the first communication unit 11A to perform processing to extend the interval of the standby operation. Receiving the request from the communication status control unit 14A, the first communication unit 11A performs processing to extend the interval of the standby operation in Step S24. Consequently, when the communication terminal 10A exists outside the second communication area X, the interval of the standby operation becomes longer compared to the case where it is within the second communication area X, as shown in FIG. 7(a). The extension of the interval of the standby operation results in a decrease in the number of times that the first communication unit 11A performs processing of the standby operation per unit time.

Referring back to FIG. 6, in Step S25, the presence status detection unit 13 acquires the presence status indicating whether communication with the personal computer 50 is possible or not possible by referring to the status of the first communication unit 11A.

Then, in Step S26, the presence status detection unit 13 determines whether the first communication is outside the communication range (where communication cannot be established). When this condition is not satisfied (S26: NO), i.e. when the communication terminal 10A is within the first communication area Y, the process repeats the processing of Steps S25 and S26 until Step S26 is satisfied. On the other hand, when the communication terminal 10A moves to the outside of the first communication area Y, the condition of Step S26 is satisfied (S26: YES), and the process proceeds to Step S27.

In Step S27, the communication status control unit 14A requests the first communication unit 11A to transition to the disconnection state or the standby state. Receiving the request from the communication status control unit 14A, the first communication unit 11A transitions to the disconnection state or the standby state in Step S28. As a result, when the communication terminal 10A moves to the outside of the first communication area Y, both of the first communication unit 11A and the second communication unit 12 enter the disconnection state or the standby state.

As described above, on occasion when a user separates the communication terminal 10A from the personal computer 50 with an intention to disconnect the first communication and the second communication, at the point when the communication terminal 10A moves to the outside of the second communication area X with a shorter communication distance, the second communication unit 12 enters the disconnection state, and further the interval of the standby operation of the first communication unit 11A is extended. The extension of the interval of the standby operation results in a decrease in the number of times that the first communication unit 11A performs the standby operation during the time when the communication terminal 10A moves from the first communication area Y to the out-of-range area Z, thus reducing the amount of power consumed in the first communication unit 11A.

(Alternative Example)

The interval of the standby operation performed by the first communication unit 11A is extended in Step S24 of FIG. 6 in the above embodiment; however, as an alternative example, the processing time of the standby operation may be shortened when the communication terminal 10A exists outside the second communication area X as shown in FIG. 7(b). In this case also, the time that the first communication unit 11A performs the standby operation while the communication terminal 10A moves from the first communication area Y to the out-of-range area Z decreases, thereby reducing the amount of power consumed in the first communication unit 11A.

Note that the shortening of the processing time of the standby operation in the above alternative example and the extension of the standby interval in the second embodiment may be done at the same time. In this case, the amount of power consumed in the first communication unit 11A can be further reduced.

(Third Embodiment)

According to this embodiment, when one communication means changes from the disconnection state to the connection state, the other communication means can promptly start communication. An overall configuration of a communication system according to the embodiment is described firstly. Note that the communication system in this embodiment is the one in which processing details of the first communication unit 11, the second communication unit 12 and the communication status control unit 14 in the first embodiment are altered.

FIG. 1 is a block diagram showing a functional configuration of a communication system 1B according to the embodiment. A communication terminal 10B is functionally composed of a first communication unit 11B (first communication means) and a second communication unit 12B (second communication means) that conduct communications with a personal computer 50, a presence status detection unit 13 (presence status detection means), and a communication status control unit 14B (communication status control means).

The personal computer 50 (another communication terminal) is functionally composed of a first communication unit 51 and a second communication unit 52 that conduct communications with the communication terminal 10B.

The first communication unit 11B of the communication terminal 10B conducts radio communications with the first communication unit 51 of the personal computer 50, and the first communication units 11B and 51 conduct communications using the FeliCa (registered trademark) function, which is a contactless IC card. Note that communications conducted between the first communication unit 11B and the first communication unit 51 are referred to hereinafter as the first communication.

The second communication unit 12B of the communication terminal 10B conducts radio communications with the second communication unit 52 of the personal computer 50. The second communication units 12B and 52 conduct communications using the TransferJet (registered trademark) function. Note that communications conducted between the second communication unit 12B and the second communication unit 52 are referred to hereinafter as the second communication.

The other elements and functions in the communication system 1B are the same as those of the first embodiment, and the explanation thereof is omitted. Further, a hardware configuration of the communication terminal 10B is also the same as the configuration explained using FIG. 2 in the first embodiment, and the explanation thereof is omitted.

An operation of the communication terminal 10B according to the embodiment is described hereinbelow.

(Disconnection State→Communication State)

Figure 8:
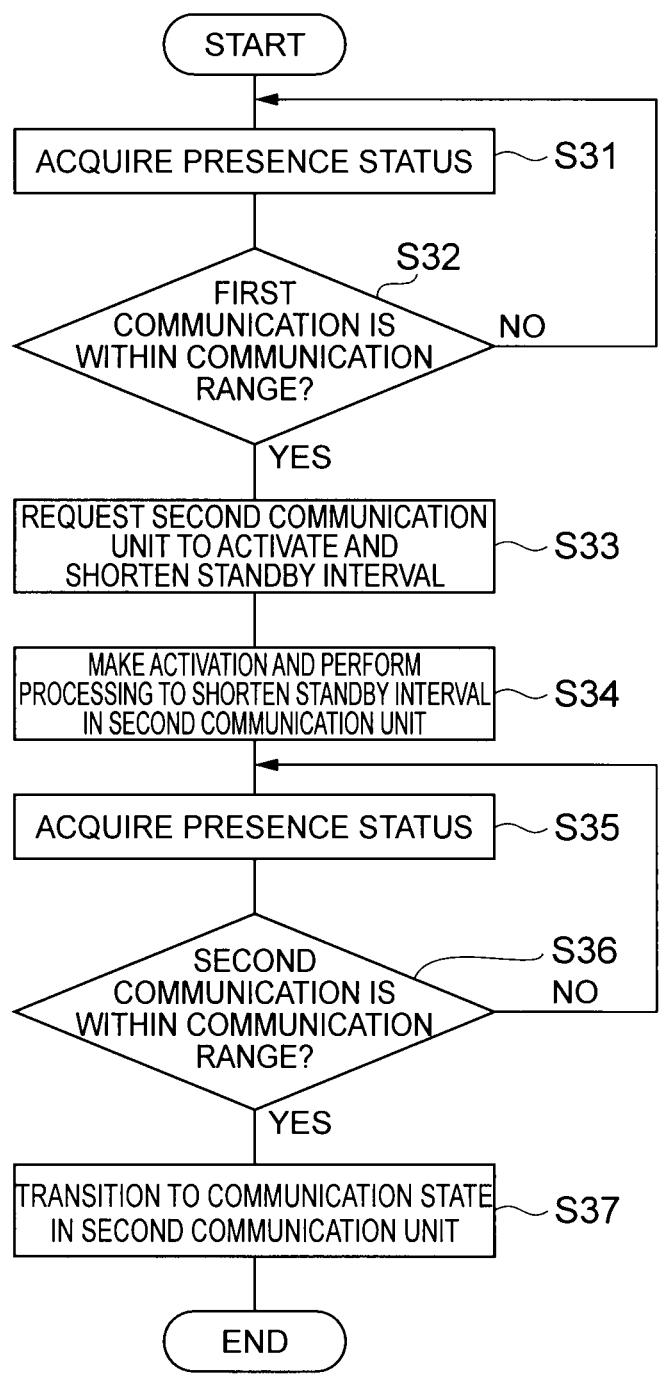
FIG. 8 is a flowchart showing a process flow when a communication terminal is brought close to a personal computer according to a third embodiment.

In the following, the case where the communication terminal 10B is gradually brought close to the personal computer 50 to turn the first communication and the second communication into the communication state is described with reference to FIGS. 3 and 8. FIG. 8 is a flowchart showing a flow of a process performed in the communication terminal 10B. Note that the flowchart of FIG. 8 begins with the state where the communication terminal 10B is within the out-of-range area Z of FIG. 3.

In Step S31 of FIG. 8, the presence status detection unit 13 acquires the presence status indicating whether communication with the personal computer 50 is possible or not possible for each of the first communication unit 11B and the second communication unit 12B by referring to the status of the first communication unit 11B and the second communication unit 12B.

In Step S32, the presence status detection unit 13 determines whether the first communication is within the communication range (where communication can be established) and the second communication is outside the communication range (where communication cannot be established). When this condition is not satisfied (S32: NO), i.e. when the communication terminal 10B is within the out-of-range area Z, the process repeats the processing of Steps S31 and S32 until Step S32 is satisfied. On the other hand, when the communication terminal 10B moves to the inside of the first communication area Y, the condition of Step S32 is satisfied (S32: YES), and the process proceeds to Step S33. Note that, when the communication terminal 10B moves to the inside of the first communication area Y, the first communication becomes available, and the first communication unit 11B of the communication terminal 10B is activated, so that the first communication unit 11B and the first communication unit 51 of the personal computer 50 become possible to communicate with each other.

In Step S33, the communication status control unit 14B requests the second communication unit 12B to transition from the disconnection state to the activation state and to perform processing to shorten the interval of the standby operation performed by the second communication unit 12B. Receiving the request from the communication status control unit 14B, the second communication unit 12B transitions from the disconnection state to the activation state and performs processing to shorten the interval of the standby operation in Step S34. Consequently, when the communication terminal 10B exists inside of the first communication area Y, the interval of the standby operation processing is shortened compared to the case where it is within the out-of-range area Z, as shown in FIG. 9(a). The shortening of the interval of the standby operation results in an increase in the time that the second communication unit 12B performs processing of the standby operation per unit time, thereby enabling more detailed and accurate tracking of the connection status of the second communication unit 12B.

Referring back to FIG. 8, in Step S35, the presence status detection unit 13 acquires the presence status indicating whether communication with the personal computer 50 is possible or not possible by referring to the status of the second communication unit 12B.

Then, in Step S36, the presence status detection unit 13 determines whether the second communication is within the communication range (where communication can be established). When this condition is not satisfied (S36: NO), i.e. when the communication terminal 10B is outside the second communication area X, the process repeats the processing of Steps S35 and S36 until Step S36 is satisfied. On the other hand, when the communication terminal 10B moves to the inside of the second communication area X, the condition of Step S36 is satisfied (S36: YES). In Step S37, the second communication unit 12B transitions to the communication state with the second communication unit 52 of the personal computer 50.

As described above, on occasion when a user brings the communication terminal 10B close to the personal computer 50 with an intention to connect the first communication and the second communication, at the point when the communication terminal 10B moves to the inside of the first communication area Y with a longer communication distance, the first communication unit 11B enters the connection state, and further the interval of the standby operation of the second communication unit 12B is shortened. The shortening of the interval of the standby operation enables more detailed and accurate tracking of the connection status of the second communication unit 12B, which allows prompt detection that the communication terminal 10B has moved into the second communication area X. It is thereby possible to bring the second communication unit 12B to transition to the communication state promptly at the point when the communication terminal 10B has moved to the second communication area X, thus reducing the time to start communication, thereby improving the convenience of users.

(Alternative Example)

The interval of the standby operation performed by the second communication unit 12B is shortened in Step S34 of FIG. 8 in the above embodiment; however, as an alternative example, the processing time of the standby operation may be lengthened when the communication terminal 10B exists inside of the first communication area Y as shown in FIG. 9(b). In this case also, the time that the second communication unit 12B performs processing of the standby operation per unit time increases, thereby enabling more detailed and accurate tracking of the connection status of the second communication unit 12B. Therefore, as in the third embodiment, it is possible to bring the second communication unit 12B to transition to the communication state promptly at the point when the communication terminal 10B has moved to the second communication area X, thus reducing the time to start communication, thereby improving the convenience of users.

Note that the lengthening of the processing time of the standby operation in the above alternative example and the shortening of the standby interval in the third embodiment may be done at the same time. In this case, more detailed and accurate tracking of the connection status of the second communication unit 12B are achieved, and the time to start communication can be further shortened, allowing further improvement of the convenience of users.

Note that, although the case of using two communication interfaces is described in the above embodiments, three or more communication interfaces may be used. Further, although communications using the FeliCa function and communications using the TransferJet function are described as examples of the first communication and the second communication, respectively, the type of the communication function is not limited thereto, and Bluetooth may be used, for example. Further, although the communication terminal according to the present invention is applied to a communication terminal having a voice call function by way of illustration, it may be applied to other terminals. Further, although the personal computer 50 is used in the description as the other end to communicate with the communication terminal 10, 10A, 10B, it is not limited thereto.

Reference Signs List 1, 1A, 1B . . . Communication system, 10, 10A, 10B . . . Communication terminal, 11, 11A, 11B, 51 . . . First communication unit, 12, 12B, 52 . . . Second communication unit, 13 . . . Presence status detection unit, 14, 14A, 14B . . . Communication status control unit, 50 . . . Personal computer

The invention claimed is:

1. A communication terminal including a first communication interface and a second communication interface with a shorter communication distance than the first communication interface, the communication terminal comprising:
circuitry configured to
detect that a distance of the communication terminal from another communication terminal to communicate with has changed from inside a communication range where communication is possible to outside the communication range where communication is not possible for the second communication interface; and
cause a standby interval in intermittent reception performed by the first communication interface to become relatively shorter when a change of the second communication interface from inside the communication range to outside the communication range is detected.

2. The communication terminal according to claim 1, wherein the circuitry is configured to shorten a standby interval in intermittent reception performed by the first communication interface.

3. The communication terminal according to claim 1, wherein the circuitry is configured to lengthen a standby operation in intermittent reception performed by the first communication interface.

4. A communication terminal including a first communication interface and a second communication interface with a shorter communication distance than the first communication interface, the communication terminal comprising:
circuitry configured to
detect that a distance of the communication terminal from another communication terminal to communicate with has changed from inside a communication range where communication is state possible to outside the communication range where communication is not possible for the second communication interface; and
cause a standby interval in intermittent reception performed by the first communication interface to become relatively longer when a change of the second communication interface from inside the communication range to communicate to outside the communication range is detected.

5. The communication terminal according to claim 4, wherein the circuitry is configured to lengthen a standby interval in intermittent reception performed by the first communication interface.

6. The communication terminal according to claim 4, wherein the circuitry is configured to shorten a standby operation in intermittent reception performed by the first communication interface.

7. A communication terminal including a first communication interface and a second communication interface with a shorter communication distance than the first communication interface, the communication terminal comprising:
   circuitry configured to
      detect that a distance of the communication terminal from another communication terminal to communicate with has changed from outside a communication range where communication is not possible to inside the communication range where communication is possible for the first communication interface; and
      cause a standby interval in intermittent reception performed by the second communication interface to become relatively shorter when a change of the first communication interface from outside the communication range to inside the communication range is detected.

8. The communication terminal according to claim 7, wherein the circuitry is configured to shorten a standby interval in intermittent reception performed by the second communication interface.

9. The communication terminal according to claim 7, wherein the circuitry is configured to lengthen a standby operation in intermittent reception performed by the second communication interface.

10. A communication control method of a communication terminal including a first communication interface and a second communication interface with a shorter communication distance than the first communication interface, the method comprising:
   detecting that a distance of the communication terminal from another communication terminal to communicate with has changed from inside a communication range where communication is possible to outside the communication range where communication is not possible for the second communication interface; and
   causing a standby interval in intermittent reception performed by the first communication interface to become relatively shorter when a change of the second communication interface from inside the communication range to outside the communication range is detected.

11. A communication control method of a communication terminal including a first communication interface and a second communication interface with a shorter communication distance than the first communication interface, the method comprising:
   detecting that a distance of the communication terminal from another communication terminal to communicate with has changed from inside a communication range where communication is possible to outside the communication range where communication is not possible for the second communication interface; and
   causing a standby interval in intermittent reception performed by the first communication interface to become relatively longer when a change of the second communication interface from inside the communication range to outside the communication range is detected.

12. A communication control method of a communication terminal including a first communication interface and a second communication interface with a shorter communication distance than the first communication interface, the method comprising:
   detecting that a distance of the communication terminal from another communication terminal to communicate with has changed from outside a communication range where communication is not possible to inside the communication range where communication is possible for the first communication interface; and
   causing a standby interval in intermittent reception performed by the second communication interface to become relatively shorter when a change of the first communication interface from outside the communication range to inside the communication range is detected.

* * * * *